US006964132B2

(12) United States Patent
Otomo et al.

(10) Patent No.: US 6,964,132 B2
(45) Date of Patent: Nov. 15, 2005

(54) NOTIFICATION CONTROL DEVICE FOR VEHICLE CLOSURE MEMBER AND RELATED NOTIFYING CONTROL METHOD (75) Inventors: Noboru Otomo, Tochigi-ken (JP); Hitoshi Kidokoro, Yokohama (JP); Yoichi Koga, Ayase (JP); Takashi Sanda, Yokohama (JP); Takeshi Utsumi, Zama (JP)

(73) Assignees: Nissan Motor Co., Ltd., Yokohama (JP); Keihin Corporation, Tokyo (JP); Nippon Cable System, Inc., Takarazuka (JP)

( * ) Notice: Subject to any disclaimer, the term of this patent is extended or adjusted under 35 U.S.C. 154(b) by 0 days.

(21) Appl. No.: 10/322,805

(22) Filed: Dec. 19, 2002

(65) Prior Publication Data
US 2003/0140565 A1 Jul. 31, 2003

(30) Foreign Application Priority Data
Dec. 21, 2001 (JP) ..................................... P2001-389902

(51) Int. Cl.⁷ .............................................. E05F 11/00
(52) U.S. Cl. ...................................................... 49/360
(58) Field of Search ........................... 49/279, 280, 360, 49/26–28; 318/280, 281, 282, 283, 265, 266, 469

(56) References Cited
U.S. PATENT DOCUMENTS

| 5,979,114 A | 11/1999 | Clark et al. |
| 6,037,727 A | 3/2000 | Kawanobe et al. |
| 6,046,510 A | 4/2000 | Kawanobe et al. |
| 6,164,015 A | 12/2000 | Kawanobe et al. |
| 6,729,071 B1 * | 5/2004 | Kawanobe et al. ........... 49/360 |

FOREIGN PATENT DOCUMENTS

| JP | 1-129384 U | 9/1989 |
| JP | 10-317795 A | 12/1998 |

OTHER PUBLICATIONS

Patent Abstracts of Japan, vol. 2000, No. 23, Feb. 10, 2001, JP 2001–150952, Jun. 5, 2001.
Patent Abstracts of Japan, vol. 2000, No. 4, Aug. 31, 2000, JP 2000–008706, Jan. 11, 2000.
Patent Abstracts of Japan, vol. 1999, No. 12, Oct. 29, 1999, JP 11–200708, Jul. 27, 1999.

* cited by examiner

*Primary Examiner*—Jerry Redman
(74) *Attorney, Agent, or Firm*—Foley & Lardner LLP (57) ABSTRACT

A device and method of notifying operation of a vehicle closure member is disclosed having a door drive motor 9 for driving a vehicle closure member, mounted in a vehicle, between an open position and a closed position, a pulse encoder 6 detecting a closure position of the vehicle closure member, and a notifying unit 7 notifying a user of operation of the vehicle closure member, with control being executed to apply a motor brake on the vehicle closure member at a time instant t1, upon recognition of operation for reverse movement when the closure position detected with the pulse encoder 9 remains in an area-just-prior-to-fully-closed-position between a half-latch position and the open position, whereupon a buzzer is activated at a time instant t2 with the motor brake being terminated when the vehicle closure member remains in the area-just-prior-to-fully-closed-position.

7 Claims, 7 Drawing Sheets

NOTIFICATION CONTROL DEVICE FOR VEHICLE CLOSURE MEMBER AND RELATED NOTIFYING CONTROL METHOD

BACKGROUND OF THE INVENTION

The present invention relates to a notification control device and notifying control method for notifying a status of a vehicle closure member that is operated between an open position and a closed position during riding in or getting off a vehicle.

In state-of-the-art, power sliding door assemblies have heretofore been widely known each of which operates a sliding door mechanism mounted to a vehicle between an open position and a closed position using a drive force of a motor. An approach has been made to provide a control device for controlling such a power sliding door assembly wherein upon detection of an operational status of an operation controller, that controls the door mechanism responsive to a user's command, and a reversed operation status of the door mechanism, a buzzer is activated to notify the user of a closure operation of the door mechanism (as disclosed in Japanese Patent Application Laid-open NO. 10-317795).

With such a control device of the power sliding door assembly, in order to permit the user to appropriately respond to a beginning of movement of the door mechanism, it is desired for the user to be notified of the beginning of movement of the door mechanism in a faster stage by causing the buzzer to produce a sound just after a user's operation is recognized or just after reversed operation of the door mechanism is detected.

Further, when compelling the door mechanism to be reversed in operation with the control device of the power sliding door assembly, owing to an increased inertial weight of the door mechanism, an attempt is made to control the motor so as to provide a motor brake for a given time interval and subsequently to rotate the motor in an opposite direction.

SUMMARY OF THE INVENTION

However, with the control device of the related art power sliding door assembly set forth above, in an event that the reversed operation of the door mechanism is commenced when the door mechanism is moved in a closing direction and remains in a position just prior to a fully closed condition, even if the motor is controlled so as to provide the brake effect, the door mechanism is caused to travel in the closing direction due to an inertial force of the door mechanism. As the door mechanism remains in the position just prior to the fully closed position and moves further in the closing direction due to the inertial force, it is probable for a lock motion of a lock mechanism to begin for restricting the door mechanism in a locked condition at the fully closed condition.

Namely, as the lock motion begins, the control device of the power sliding door assembly becomes hard to control the door mechanism and, consequently, it becomes hard to execute the reversed operation of the door mechanism. In such a case, even when notifying the user of the reversed operation of the door mechanism by compelling the buzzer to produce the sound just after recognition of the user's operation set forth above or just after detection of the reversed operation of the door mechanism, resulting in an incapability of achieving the reversed operation of the door mechanism.

The present invention has been proposed with the above view in mind and has an object to provide a control device for a vehicle closure member and a notifying control method for the vehicle closure member which, in order for a user to appropriately respond to a beginning of operation of a door mechanism, are enabled to notify the operation of the door mechanism at a proper timing.

To address the above issue, a first aspect of the invention provides a notification control device for a vehicle closure member, comprising a vehicle closure member mounted on a vehicle for opening and closing capabilities, a drive unit driving the vehicle closure member between an open position and a closed position, a control unit controlling the drive unit, a position detection unit detecting a closure position of the vehicle closure member, a notifying unit operative to notify reverse operation of the vehicle closure member when at least a driving direction in which the vehicle closure member is driven is reversed, and a notification timing control unit controlling a timing at which notifying is executed with the notifying unit in dependence on the closure position detected with the position detecting unit.

Further, a second aspect of the invention provides a notification control device for a vehicle closure member, comprising a vehicle closure member mounted on a vehicle for opening and closing capabilities, drive means for driving the vehicle closure member between an opening position and a closing position, control means for controlling the drive means, position detection means for detecting a closure position of the vehicle closure member, notifying means for notifying reverse operation of the vehicle closure member when at least a direction in which the vehicle closure member is driven is reversed, and notification timing control means for controlling a timing at which notifying is executed with the notifying means in dependence on the closure position detected with the position detecting means.

Furthermore, a third aspect of the invention provides a method of notifying operation of a vehicle closure member, comprising discriminating whether a vehicle closure member is operated between an open position and a closed position, discriminating whether a direction in which the vehicle closure member travels is reversed, detecting a closure position of the vehicle closure member when the direction in which the vehicle closure member travels is reversed, and controlling a timing at which operation of the vehicle closure member is notified in dependence on the closure member that is detected.

DETAILED DESCRIPTION OF THE PREFERRED EMBODIMENT

Hereinafter, an embodiment of the present invention is described with reference to the drawings.

Overall Structure of Sliding Door Control System

The sliding door control system includes a door notification control device 1 that controls operation of a sliding door mechanism (vehicle door closure member) mounted on a vehicle while notifying a user of operation of the door mechanism. With the sliding door control system, the door notification control device 1 controls the door mechanism in a range between a position (half-latched position), in which a half-door condition is detected, and a fully opened position. Hereinafter, the half-latched position is referred to as a "fully closed position" in the door notification control device 1.

The door notification control device 1 is connected to an operational input section composed of a door operator unit 2 and a main operator unit 3, a half-latch switch 4, a battery voltage detector 5 and a pulse encoder 6 to receive input signals from these components. Also, the door notification control device 1 is connected to a notifying unit 7 and a driver circuit 8 to deliver an output signal thereto for control thereof.

Further, the sliding door control system is comprised of a door drive motor 9 connected to the driver circuit 8 to operate the door mechanism D, forming the vehicle closure member, between an open position and a closed position and mechanically coupled to the pulse encoder 6 indicative of a displacement value of the door mechanism D. The door drive motor 9 is operative to control start-up or interruption of the door mechanism D.

The door operator unit 2 and the main operator unit 3 may be mounted at an area of the vehicle where the user is able to operate when riding in the vehicle, or accommodated in a key type remote controller. Discrete user's operations on the operator unit 2 and the main operator unit 3 provide operational input signals to be outputted to the door notification control device 1.

The door operator unit 2 is comprised of a switch for producing an operational input signal to cause an opening operation of the door mechanism D to begin, and a switch for producing an operational input signal to cause a closing operation of the door mechanism D to begin. The door operator unit 2 responds to the respective switches being operated to allow the operational input signals to be outputted to the door notification control device 1.

The main operator unit 3 is comprised of a switch for producing a signal to enable or disenable control of the sliding door control mechanism and, whenever operated, outputs an enabling signal or a disenabling signal to the door notification control device 1.

The half-latch switch 4 includes a detection mechanism that detects the half-door condition (half-latch condition) of the door mechanism. When the door mechanism D is moved in a closing direction to allow the half-door condition to be detected with the detection mechanism, the half-latch switch 4 outputs a half-latch detection signal to the door notification control device 1.

The battery voltage detector 5 is connected with the battery mounted on the vehicle, not shown, and detects an output voltage of a battery to produce a battery voltage detection signal that is outputted to the door notification control device 1.

The pulse encoder 6 is interconnected to the door drive mechanism 9 to produce a train of pulses (door-mechanism operating pulses) in response to a rotational angle of the door drive motor 9, with the train of pulses being outputted to the door notification control device 1. The door-mechanism operating pulses produced with the pulse encoder 6 are outputted at an output frequency determined by a travel speed of the door mechanism D owing to a particular structure of the door drive motor 9 and the pulse encoder 6 interconnected thereto.

Figure 2:
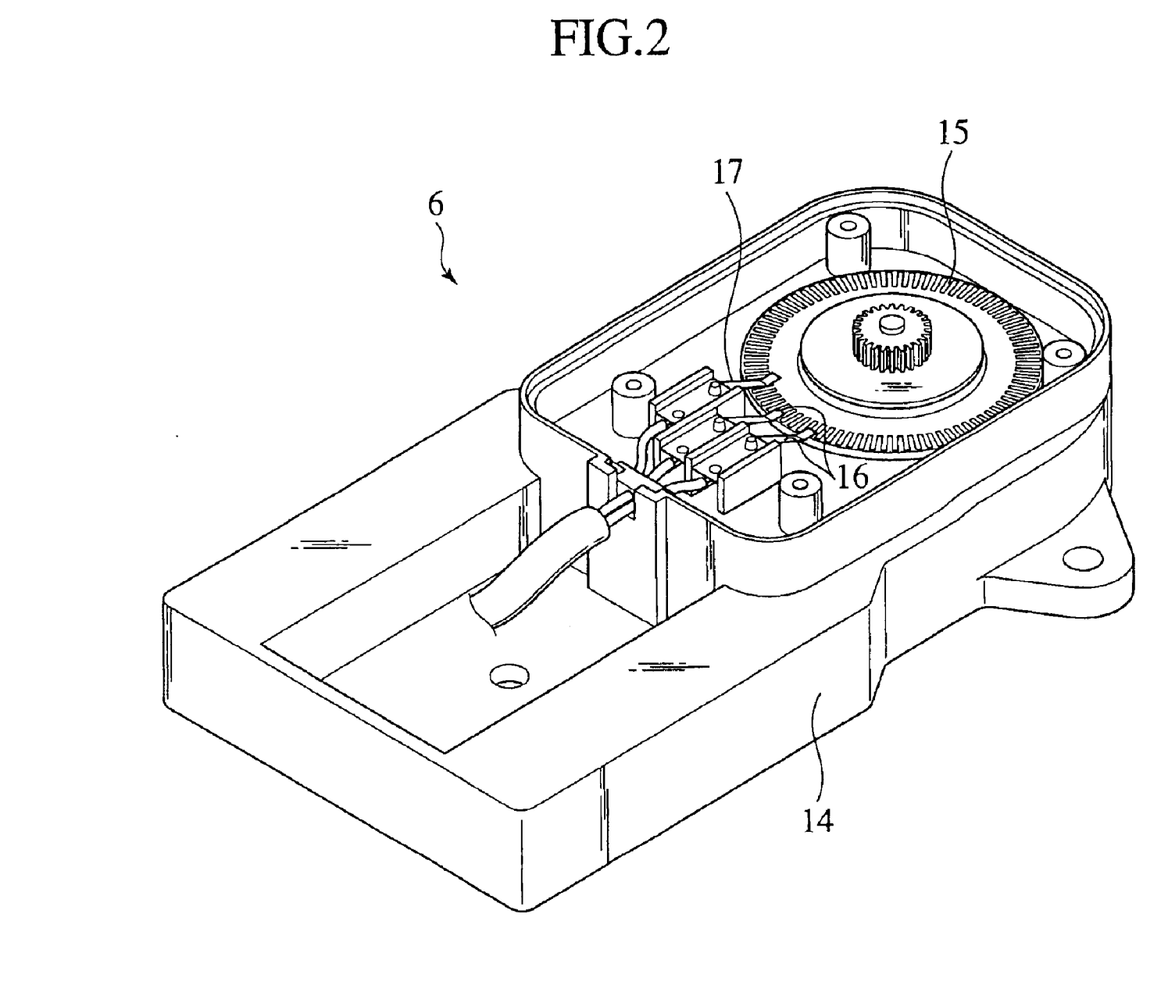
FIG. 2 is a front perspective view of a pulse encoder.
Figure 3:
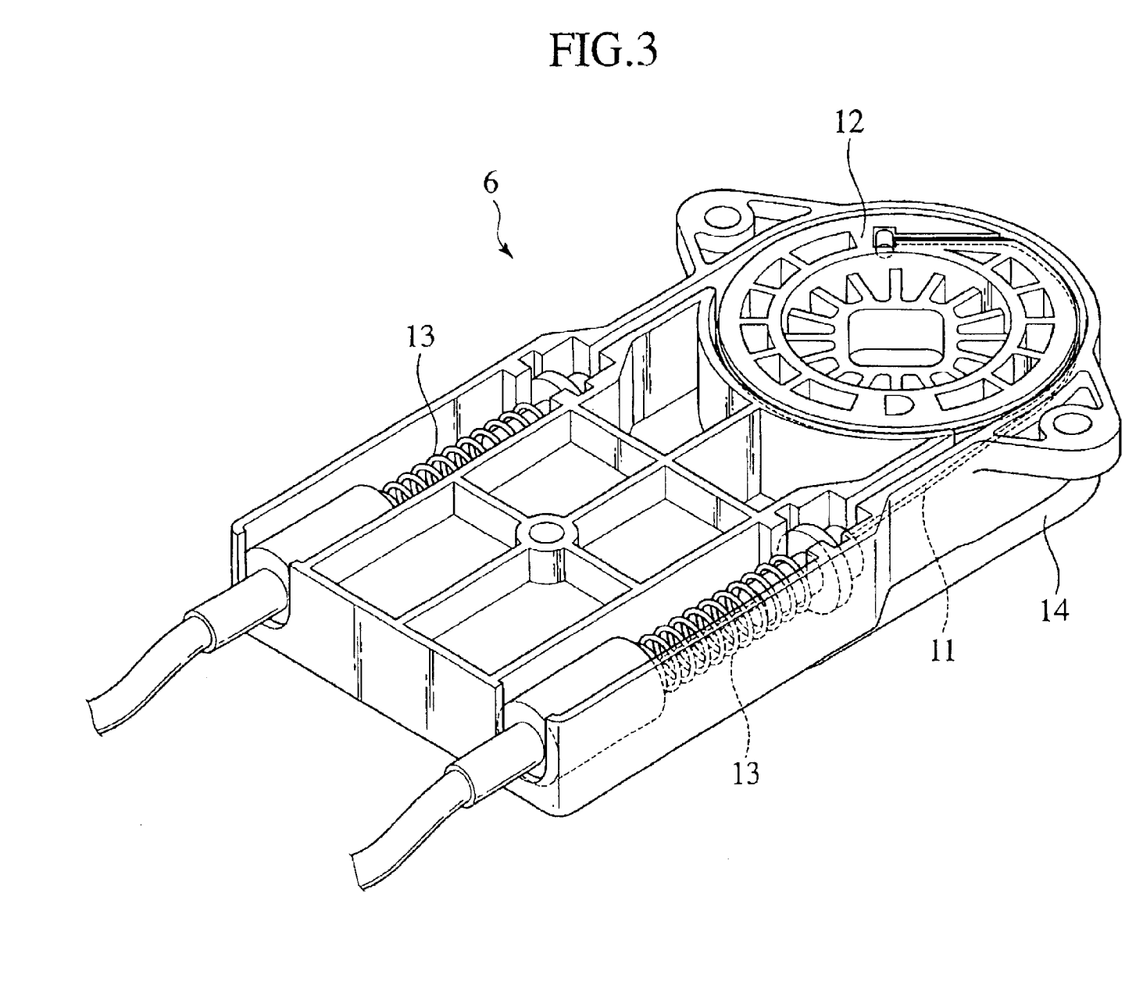
FIG. 3 is a rear perspective view of a pulse encoder.

The pulse encoder 6 is structured as shown in a frontal perspective view shown in FIG. 2 and a rear perspective view shown in FIG. 3. As shown in FIG. 3, the pulse encoder 6 is comprised of a wire 11 linked to the door mechanism D, a rotatable member 12 with its peripheral wall wounded with a portion of the wire 11, and a spring mechanism 13 operative to tension the wire 11 at a given tensioned force, all of which are encapsulated in a housing 14. When the door drive motor 9 is rotated, the rotatable member 12 rotates to wind up the wire 11 or release the same. Thus, the presence of operations of the rotatable member 12 for winding up the wire 11 or releasing the wire 11 enables the door mechanism D to be operated between the open position and the closed position.

Further, as shown in FIG. 2, the pulse encoder 6 includes a rotatable electrode plate 15 whose rotational axis is aligned with a central axis of the rotatable member 12, two rotation detector terminals 16, 16 held in sliding contact with the rotatable electrode plate 15 with electrodes being formed thereon at given, circumferentially spaced positions, and an earth terminal 17. Rotating the rotatable member 12 with a drive force of the door drive motor 9 to cause the rotatable electrode plate 15 to rotate allows the rotation detection terminals 16, 16 of the pulse encoder 6 to slide with the electrodes of the rotatable electrode plate 15 for thereby permitting the pulse encoder 6 to produce the train of door-mechanism driving pulses. Also, while the presently filed embodiment has been described as employing the mechanical encoder set forth above, it may be replaced with an optical type encoder.

The notifying unit 7 includes a buzzer mechanism that produces a given buzzer sound in response to the control signal from the door notifying control device 1.

The driver circuit 8 is applied with a duty-controlled battery voltage from the battery that is not shown and also applied with the control signal indicative of a direction in which the door drive motor 9 is to be rotated.

The driver circuit 8 supplies drive current, depending on the battery voltage, to the door drive motor 9 in accordance with the control signal, thereby permitting the door drive motor 9 to be rotationally driven in the opening or closing direction.

Figure 4:
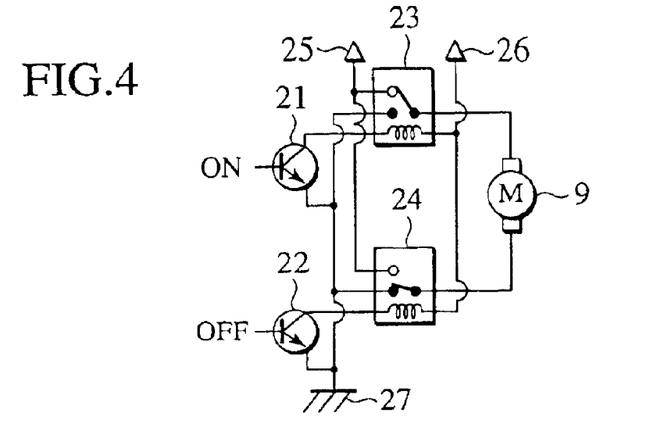
FIG. 4 is a circuit diagram of a driver circuit that drives a door drive motor so as to operate a door mechanism in an opening direction.
Figure 5:
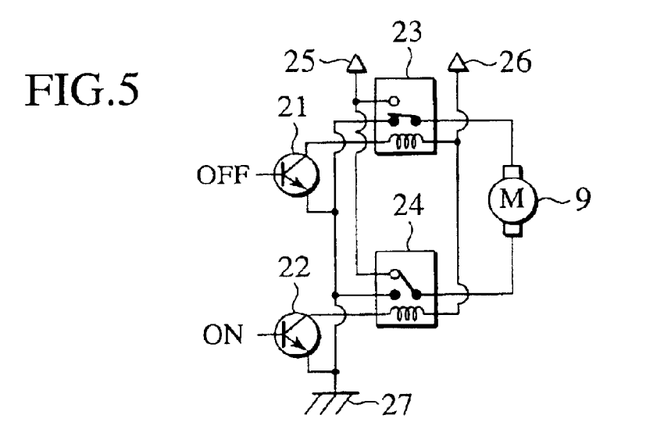
FIG. 5 is a circuit diagram of the driver circuit that drives the door drive motor so as to operate the door mechanism in a closing direction.
Figure 6:
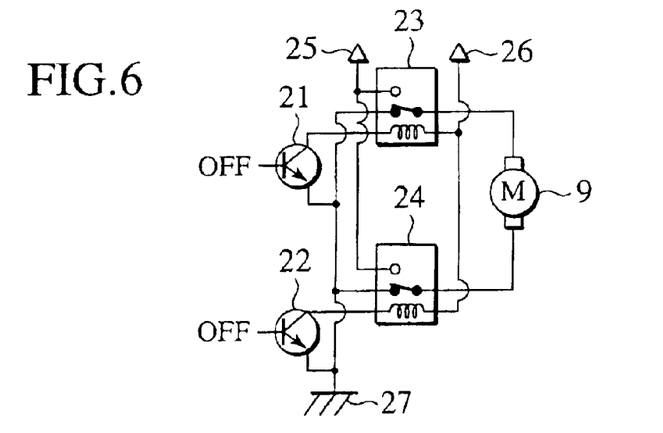
FIG. 6 is a circuit diagram of the driver circuit that drives the door drive motor so as to stop the door mechanism.

As shown in a circuit structure shown in FIGS. 4 to 6, the driver circuit 8 is comprised of first and second switches 21, 22, first and second relays 23, 24, first and second electric power input terminals 25, 26, and a ground terminal 27. The first and second switches 21, 22 of the driver circuit 8 are applied with the control signal indicative of the direction in which the door drive motor 9 is driven, and the first or second electric power input terminals 25, 26 are applied with the battery voltage with the controlled duty and the relay drive signal that drives the first or second relays 23, 24.

When driving the door drive motor 9 in the direction to cause the door mechanism to be opened, as shown in FIG. 4, the driver circuit 8 is supplied with the control signals to cause the first switch 21 to turn on and to cause the second switch 22 to turn off, with the first electric power input terminal 25 being supplied with the battery voltage with controlled duty while the second electric power input terminal 26 being supplied with the relay drive voltage. This the first relay 23 to turn on and the second relay 24 to turn off to allow the door drive motor 9 to be supplied with the drive current determined by the battery voltage supplied to the first electric power input terminal 25 and to be driven in the direction to open the door mechanism D.

Further, when driving the door drive motor 9 in the direction to close the door mechanism D, as shown in FIG. 5, the driver circuit 8 is supplied with the control signals to cause the first switch 21 to turn off and to cause the second switch 22 to turn on such that the second electric power input terminal 26 is supplied with the battery voltage with the controlled duty and also the first electric power input terminal 25 is supplied with the relay drive signal. This causes the second relay 24 to turn on and the first relay 23 to turn off to allow the door drive motor 9 to be supplied with the drive current determined by the battery voltage supplied to the second electric power input terminal 26 to be driven in the direction to close the door mechanism D.

Furthermore, when interrupting the door drive motor 9 to cause the door mechanism D to be controlled in a braked state, as shown in FIG. 6, the driver circuit 8 is supplied with the control signals to cause the first and second switches 21, 22 to turn off. This causes the first and second relay 23, 24 to turn off to allow to interrupt the supply of drive current to the door drive motor 9 to apply the braking effect to the door mechanism D. Also, while the presently filed embodiment is structured so as to achieve the brake control of the door mechanism D using the door drive motor 9, it may be possible for an additional brake unit to be provided separately from the drive motor.

Structure of the Door Notifying Control Device 1

Figure 1:
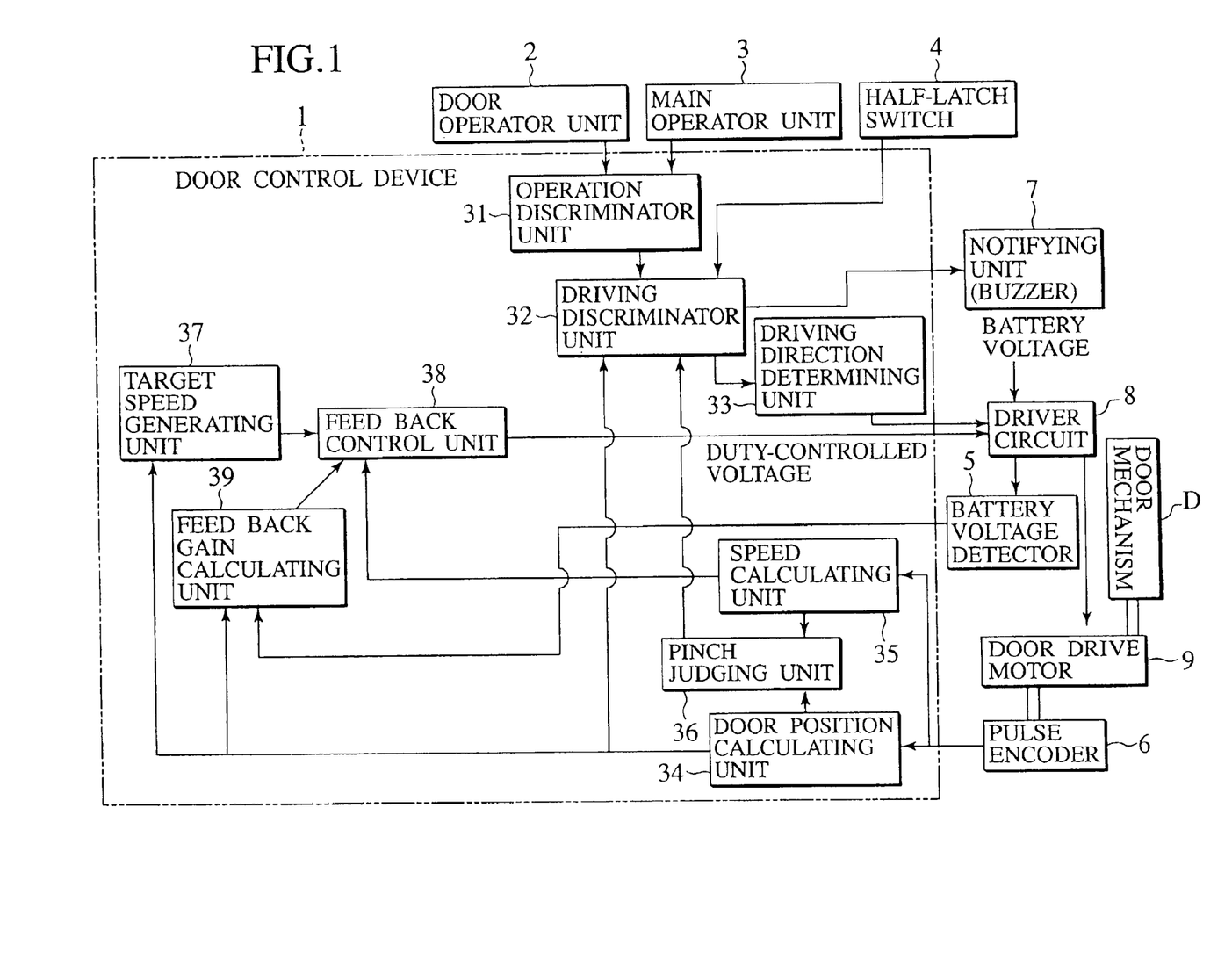
FIG. 1 is a block diagram illustrating an overall structure of a sliding door control system to which the present invention is applied.

As shown in a functional block diagram in FIG. 1, the door notification control device 1 is comprised of the door operator unit 2, an operation discriminator unit 31 adapted to be applied with an operational input signal from the main operator unit 3, a driving discriminator unit 32 adapted to be applied with a half-latch detection signal from the half-latch switch 4, a driving direction determining unit 33, a door-position calculating unit 34 adapted to be applied with the door-mechanism operating pulses from the pulse encoder 6, a speed calculating unit 35, a pinch judging unit 36, a target speed generating unit 37, a feed back control unit 38 and a feed back gain calculating unit 39.

The door-position calculating unit 34 is applied with the door-mechanism operating pulses to calculate a displacement position of the door mechanism D. The door position calculating unit 34 stores a count of "300" indicative of door positional information at which the door mechanism D remains in the fully opened condition. Then, owing to movement of the door mechanism D from the fully opened condition in the closing direction to cause the door-mechanism operating pulses to be inputted to the door-position calculating unit 34, the door position calculating unit 34 calculates the door positional information by subtracting a count from the value "300". The door-position calculating unit 34 outputs the resulting door positional information to the pinch judging unit 36, the driving discriminator unit 32 and the target-speed generating unit 37.

The speed calculating unit 35 is applied with the door-mechanism operating pulses from the pulse encoder 6 and calculates the frequency of the door-mechanism D operating pulses, thereby computing the travel speed of the door mechanism to produce travel speed information which is outputted to the pinch judging circuit 36 and the feed back control unit 38.

The pinch judging unit 36 detects the presence of an obstacle pinched in the door mechanism D on the basis of door positional information and travel speed information. Upon detection of the presence of the obstacle that is pinched, the pinch judging unit 36 outputs a pinch detection signal to the driving discriminator unit 32.

Upon receipt of the operational input signals from the door operator unit 2 and the main operator unit 3, the operation discriminator unit 31 discriminates operational statuses of the door operator unit 2 and the main operator unit 3 and outputs operational status discriminating signals to the driving discriminator unit 32.

The driving discriminator unit 32 recognizes the operational statuses caused by the user in response to the operational status discriminating signals from the operation discriminator unit 31. Also, upon receipt of the half-latch detection signal from the half-latch switch 4, the driving discriminator unit 32 recognizes the presence of a half-door condition of the door mechanism D.

Under such a half-door condition, the driving discriminator unit 32 recognizes that the position of the door mechanism D remains in an area outside the controllable range of the sliding door control system and the lock mechanism remains in a controllable range, and that the door mechanism D is held in a restricted condition to remain in a closed condition. Thus, the driving discriminator unit 32 is brought into a disenabled condition with no control being implemented for operation of the door mechanism D. Further, the driving discriminator unit 32 is connected to the door position calculating unit 34 and the pinch judging 36 to receive the door positional information and the pinch detection signal.

The driving discriminator unit 32 discriminates driving statuses of the drive mechanism D and the notifying unit 7 in response to the input signals to produces a buzzer drive signal that is applied to the notifying device 7, while outputting a driving status signal, indicative of the driving status of the door mechanism D, to the driving direction determining unit 33. Here, the driving discriminator unit 32 varies a timing at which the drive signal is outputted to the notifying unit 7 responsive to the door position information, thereby controlling a timing at which the buzzer sound is generated with the notifying unit 7.

Upon receipt of the operation status discriminating signal from the operation discriminator unit 31 to cause the door mechanism D to be reversed in travel, initially, the driving discriminator unit 32 outputs the driving status signal to the driving direction determining unit 33 to cause a motor-brake effect to be applied. Subsequently, the driving discriminating unit 32 outputs the driving status signal to the driving direction determining unit 33 to cause the door mechanism D to travel in the reverse direction after the motor-brake effect has been effectuated for a given time interval.

Further, the driving discriminator unit 32 discriminates whether the door mechanism D remains in an area-just-prior-to-fully-closed-position between the fully closed position and a given displacement position, or whether the door mechanism D remains in an area outside the area-just-prior-to-fully-closed-position between such a given displacement position and the fully open position. The given displacement position is so determined to assume a location closer to the fully opened position than a position at which the door mechanism D is subjected to an inertial force of the door mechanism D and the half-latch operation is disenabled to begin under a condition where reverse operation is initiated during movement of the door mechanism D in the closing direction. The given displacement position is preliminarily determined based on the speed of the door mechanism D depending on the displacement position and the weight of the door mechanism D and then stored in the driving discriminator unit 32.

Figure 7:
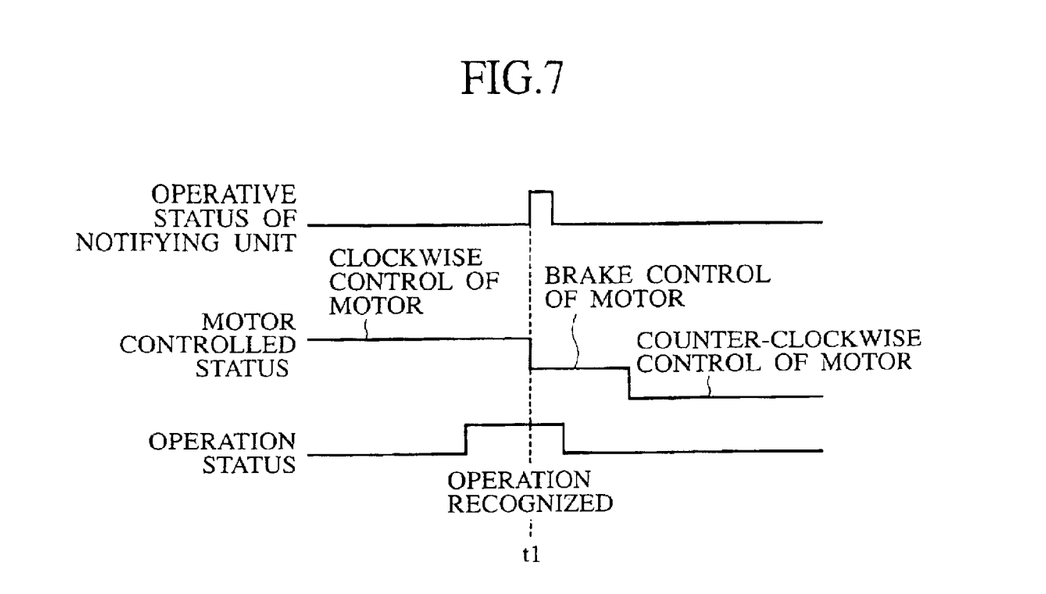
FIG. 7 is a timing chart illustrating an operative condition of a notifying unit, a motor controlled status and an operative condition in terms of time with the door mechanism remaining in an area outside an area-just-prior-to-fully-closed-position.
Figure 8:
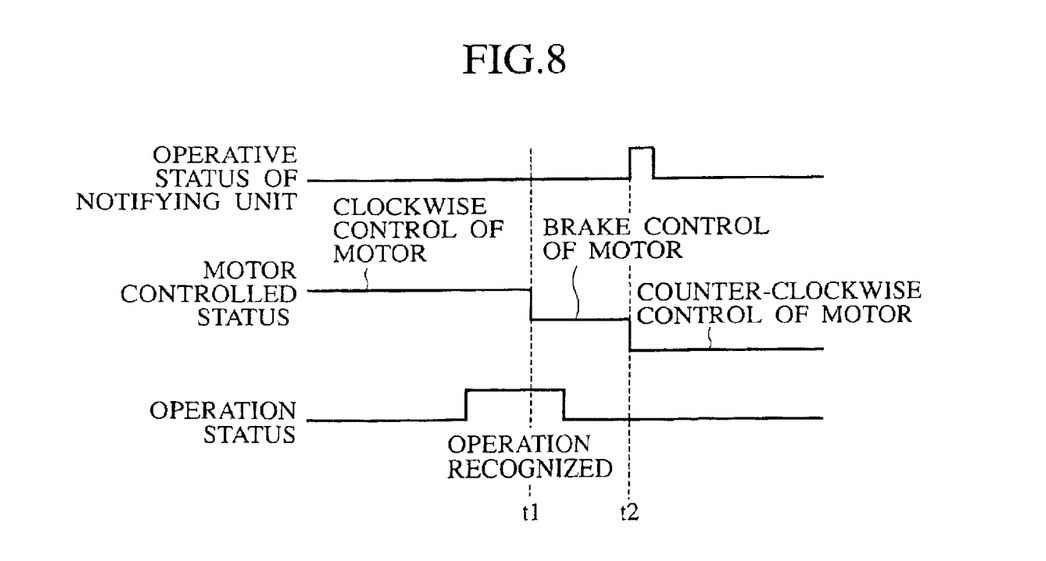
FIG. 8 is a timing chart illustrating the operative condition of the notifying unit, the motor controlled status and the operative condition in terms of time with the door mechanism remaining in the area-just-prior-to-fully-closed-position.

Upon receipt of the operational status discriminating signal to render the direction in which the door mechanism D travels, the driving discriminator unit 32 discriminates whether or not the door mechanism D remains in the area outside the area-just-prior-to-fully-closed-position. Then, as shown in FIG. 7, if the driving discriminator unit 32 discriminates that the door mechanism D is located in the external area-just-prior-to-fully-closed-position at a time instant t1 at which the reversed operation is recognized, the notifying unit 7 is driven at the time instant t1. On the contrary, if it is discriminated that the door mechanism D is located in the area-just-prior-to-fully-closed-position at the time instant t1 at which the operational status discriminating signal is inputted, then as shown in FIG. 8, the notifying unit 7 is driven at a time instant t2 at which the control for the motor-brake effect is terminated to enable control for reverse operation to begin to cause the door mechanism D to travel in the reverse direction. Here, the driving discriminator unit 32 interrupts the control for the motor-brake effect upon receipt of the half-latch detection signal from the half-latch switch 4 after receipt of the operational status discriminating signal to cause the door mechanism D to travel in the revere direction.

The driving direction determining unit 33 discriminates the direction in which the drive motor 9 is driven in response to the driving status signal from the driving discriminator unit 32, outputting the control signal to the first and second switches 21, 22 of the driver circuit 8.

The target speed generating unit 37 is applied with the door positional information from the door position calculating unit 34 to obtain the travel speed to be targeted of the door mechanism D in dependence on the door displacement position, with the target speed information being outputted to the feed back control unit 38. The target speed generating unit 37 has a memory area, not shown, that stores a door displacement position/target speed correlated table, allowing the target speed information to be obtained referring to the door displacement position/target speed correlated table.

The feed back gain calculating unit 39 calculates an integral gain, a proportional gain and a feed forward gain to allow the door drive motor 9 to provide a required torque in response to the battery voltage detection signal and the door positional information, with a resulting calculated output being applied to the feed back control unit 38.

The feed back control unit 38 is preset to a gain that is determined with the feed back gain calculating unit 39 and performs a logical operation so as to allow the target speed to coincide with a current travel speed for producing a duty cycle signal, indicative of a duty ratio to cause the door drive motor 9 to provide the required torque, which is outputted to the driver circuit 8.

Door Status Notifying Operation with Door Notifying Control Device 1

Figure 9:
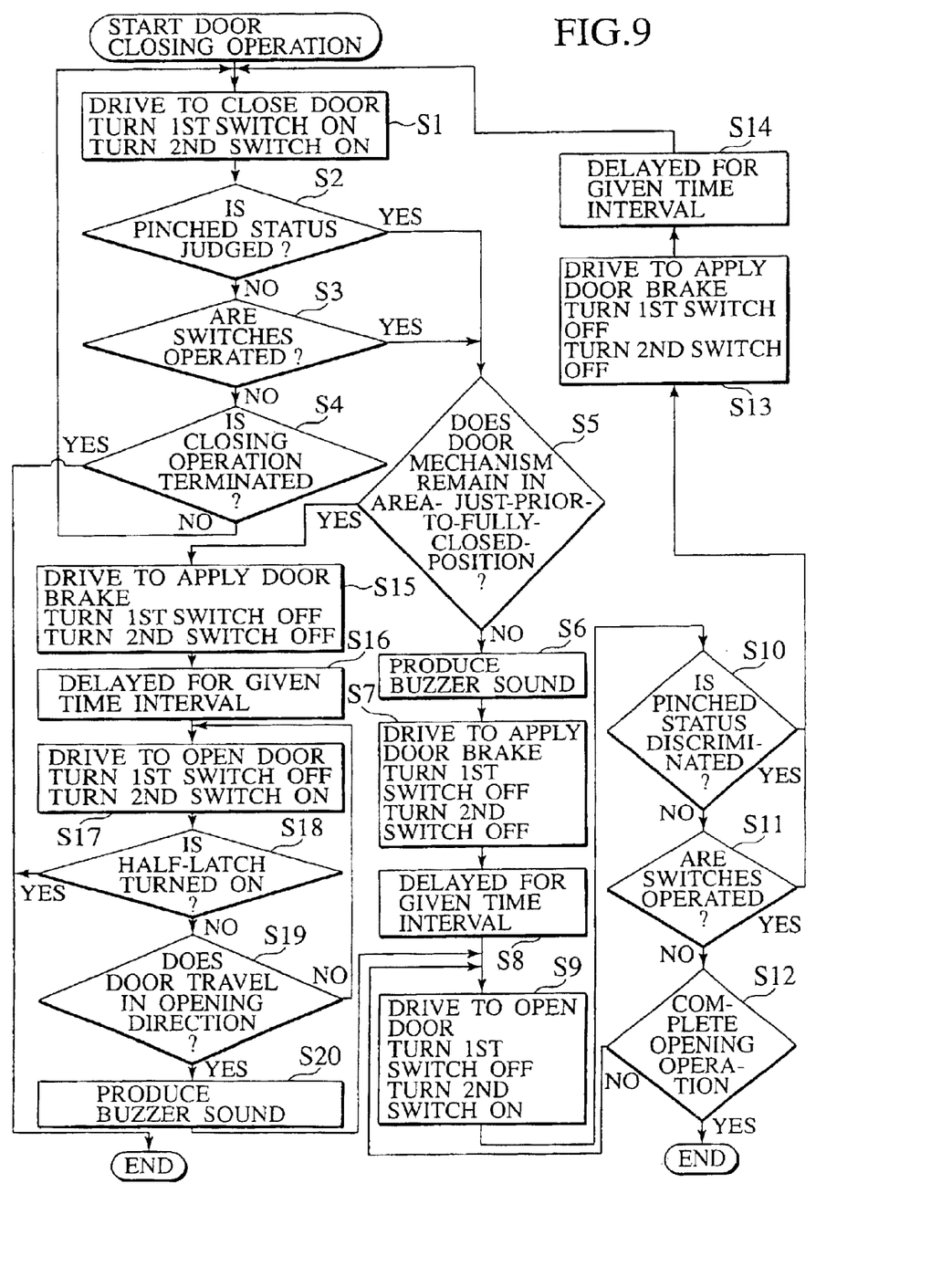
FIG. 9 is a flowchart illustrating the basic sequence of operations of detecting a door status to be implemented with a door notifying control device.

Now, a detailed description is given below with reference to FIG. 9 for the basic sequence of door status notifying operations to be performed when beginning the closing operation of the door mechanism D with the sliding door control system with the structure set forth above.

The sliding door control system begins to execute the operations subsequent to step S1 when the door operator unit 2 is operated to apply the operation discriminating unit 31 with the operation input signal to cause the door mechanism D to travel in the closing direction and the driving status of the door drive motor 9 is discriminated with the driving discriminator unit 32.

First, the driving discriminator unit 32 outputs the operation status discriminating signal to the driving direction determining unit 33 and outputs the control signals to the first and second switches 21, 22 of the driver circuit 8 to cause the driving direction determining unit 33 to drive the door drive motor 9 in the door-mechanism closing direction, with the driver circuit 8 assuming an operative state shown in FIG. 5 (step S1). This causes the door drive motor 9 to be driven to permit the door mechanism D to travel in the closing direction.

Next, the driving discriminator unit 32 judges the presence of or the absence of the input signals, discriminates whether the pinch detection signal is inputted (step S2), discriminates whether the input operation is made for reverse operation (step S3) and discriminates whether the closing operation is completed responsive to the half-latch switch detection signal (step S4). If there is no pinch detection signal and operation status discriminating signal for reverse operation and the fully closed position is recognized based on the door positional information, then it is supposed that the closing operation of the door mechanism is completed, thereby terminating the operation. Further, if there is no pinch detection signal and operation status discriminating signal for reverse operation and the fully closed position is not recognized, operation is routed back to step S1 again.

With the pinch detection signal or the operation status discriminating signal for the reverse operation being inputted to the driving discriminator unit 32, the driving discriminator unit 32 commences the operation for causing the door mechanism D to be reversed from the door-mechanism closing direction to travel in the opening direction.

Initially, the driving discriminator unit 32 discriminates from the door positional information whether the door mechanism D remains in the area-just-prior-to-fully-closed-position (step S5). If it is discriminated that the door mechanism does not remain in the area-just-prior-to-fully-closed-position, then the notifying unit 7 is applied with the drive signal, thereby producing the buzzer sound (step S6).

In such a manner, as previously described with reference to FIG. 7, the operation for the reverse operation or the pinch status are detected and, substantially at the same time, the notifying unit 7 is activated. The driving discriminator unit 32 energizes the notifying unit 7 while controlling the driving direction determining unit 33 to render the first and second switches 21, 22 to turn off for thereby controlling the door brake effect (step S7). If the driving discriminator unit 32 discriminates that a given time interval is delayed under the control of the door brake effect (step S8), then it controls the driving direction determining unit 33 so as to cause the door drive motor 9 to be driven in the reverse direction to permit the door mechanism D to be driven in the opening direction. Thus, the driving direction determining unit 33 turns on the first switch 21 while turning off the second switch 22, as shown in FIG. 4, to cause the door mechanism D to be operated in the opening direction (step S9).

Then, under the condition where the driving discriminator unit 32 operates to cause the door mechanism D to travel in the opening direction, the driving discriminator unit 32 discriminates the presence of or the absence of the input signals, discriminates whether the pinch signal is applied (step S10), discriminates whether the operation is executed on the door operator unit 2 for the reverse operation (step S11) and further discriminates whether the opening operation is completed (step S12). Upon receipt of the pinch detection signal or the operation status discriminating signal for the reversing operation, the driving discriminator unit 32 executes control for the brake effect to enable reversing operation from the opening direction to the closing direction (step S13), and after the delay for the given time interval (step S14), flow is routed back to step S1.

Further, during a time interval in which the door positional information indicates that the door mechanism does not remain in the fully opened position and does not complete the opening operation, repeated operations of steps S9 to S12 are executed, and operation is terminated when the door mechanism is brought into the fully opened position.

With the position of the door mechanism remaining in the area-just-prior-to-fully-closed-position in step S5, when desired to perform the reversing operation, first, the driving discriminator unit 32 controls the driving direction determining unit 33 so as to cause the first and second switches 21, 22 to turn off, executing the control for the brake effect (step S15). If the driving discriminator unit 32 discriminates that the given time interval is delayed under the control of the brake effect (step S16), then the driving discriminator unit 32 controls the driving direction determining unit 33 so as to cause the door drive motor 9 to be operated in the reverse direction to permit the door mechanism to be driven in the opening direction (step S17) and discriminates the presence of or the absence of the half-latch detection signal (step S18).

If the door mechanism is discriminated with the driving discriminator unit 32 to remain in the half-latch condition, the driving discriminator unit 32 terminates the operation upon judgment in that the door mechanism D remains in the controllable range of the lock mechanism and the door mechanism assumes the closed condition (restricted status). Further, upon discrimination that the door mechanism D does not remain in the half-latch condition, the driving discriminator unit 32 discriminates on the basis of the door positional information whether the door mechanism D is actually moved in the opening direction due to control in step S17 (step S19) and if it is discriminated that the door mechanism D is actually moved in the opening direction, then the drive signal is applied to the notifying device 7 to cause the buzzer sound to be produced (step S20).

Thus, as shown in FIG. 8 and described with reference thereto, when the door mechanism D is located in the area-just-prior-to-fully-closed-position when performing the reversing operation, the notifying device 7 is activated under a condition in that after the control for the brake effect is terminated, the door mechanism D remains in the controllable position.

Figure 10:
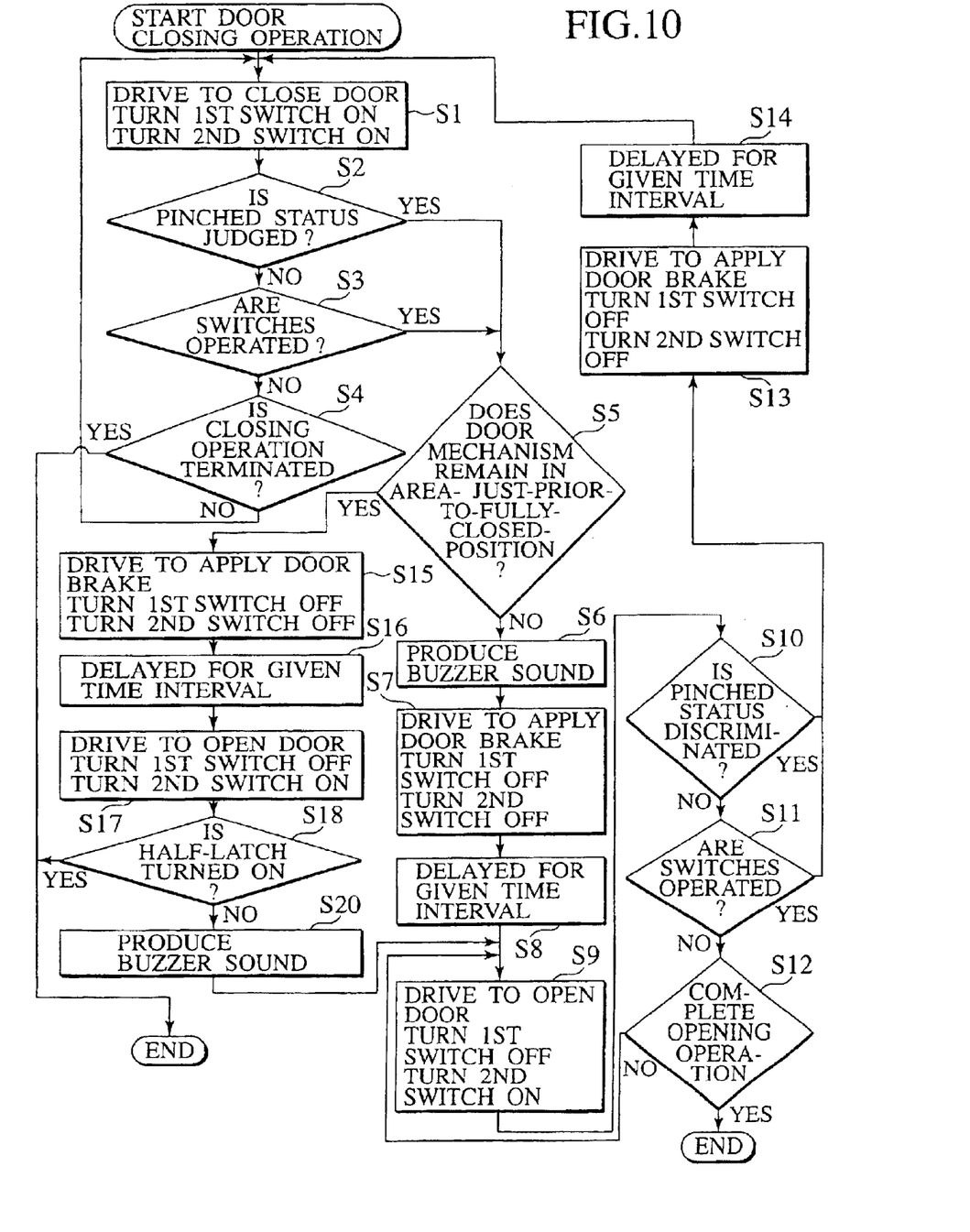
FIG. 10 is a flowchart illustrating another basic sequence of operations of detecting the door status to be implemented with the door notifying control device.

Further, in an event that the position of the door mechanism remains D in the area-just-prior-to-fully-closed-position in step S5, as shown in FIG. 10, the driving discriminator unit 32 may not discriminate whether the door mechanism D actually encounters the reverse operation in the opening direction subsequent to step S18 and may drive the notifying device 7 in step S20. Namely, after executing control for causing the door mechanism D to travel in the opening direction (step S17), the driving discriminator unit 32 activates the notifying unit 7 (step S20) when it is discriminated that the door mechanism D does not remain in the half-latch condition (step S18).

Further, while the presently filed embodiment is structured to allow the discrimination to be made to find out the presence of or the absence of the half-latch detection signal (step S18) after the control of the door drive motor 9 in the reverse direction is executed (step S17), it may be altered in structure such that the door drive motor 9 is controlled to operate in the reverse direction after the discrimination is made to find out the presence of or the absence of the half-latch detection signal.

Furthermore, while the present field embodiment is applied to control of the sliding door mechanism, it may be altered in application for a trunk grid and other vehicle door closure members.

As previously described above in detail, according to the sliding door notification control apparatus of the presently filed embodiment, when controlling the door drive motor 9 to cause the door mechanism D to be operated in the reverse direction, the door positional information may be used to discriminate whether the door mechanism D remains in the area-just-prior-to-fully-closed-position such that the notifying timing of the notifying unit 7 is altered as set forth above in conjunction with FIGS. 7 and 8. Consequently, the sliding door control apparatus is able to avoid a deficiency in that the notifying is made regardless of the fact that the door mechanism D travels to the half-latch position due to the inertial force of the door mechanism D and disenabled in operation in the reverse direction even if the door mechanism D tries to begin the reverse operation when the door mechanism D is located in the area-just-prior-to-fully-closed-position. Accordingly, the sliding door notifying control system is able to notify the user of the operation of the door mechanism D at an appropriate timing available for starting the reverse operation.

Further, according to the sliding door notification control apparatus of the presently filed embodiment, since the notifying timing is controlled in an event that when operating the door mechanism D in the reverse direction, the closure position of the door mechanism D detected with the door position calculating unit 34 remains in the area-just-prior-to-fully-closed-position forming the predetermined given area, it is possible for the operation of the vehicle closure member to be notified at an appropriate timing even when the door mechanism D is operated due to the inertial force during the reverse operation.

Further, according to the sliding door notification control apparatus, since the control signal is applied to the driver circuit 8 to drive the door mechanism D to cause the notifying to be made when the control signal is transmitted from the feed back control unit 38 to the driver circuit 8 only when the door mechanism D is not restricted with the lock mechanism, the sliding door notification control unit 8 enables to realize the same effects as those set forth above.

Furthermore, according to the sliding door notification control apparatus of the presently filed embodiment, when reversing the driving direction of the door mechanism D, since the notification is implemented in a case where the reverse driving is implemented after the driving of the door mechanism D is braked with the door drive motor 9 for the given time interval and, after the brake effect is provided for the given time interval, the door mechanism D is not restricted, the sliding door control apparatus enables the same effects as those set forth above to be realized.

Moreover, according to the sliding door notification control apparatus of the presently filed embodiment, since the notification is implemented when the presence of the door mechanism D being driven in the reverse direction is detected on the basis of the closure position detected with the door position calculating unit 34, the sliding door notification control apparatus enables the same effects as those set forth above to be realized.

In addition, according to the sliding door notification control apparatus of the presently filed embodiment, since the notifying timing is controlled only when the driving direction of the door mechanism D is reversed from the closing direction to the opening direction, it is possible to avoid the notifying operation to be performed regardless of the fully closed condition brought out due to the inertial force of the door mechanism D.

Further, according to the sliding door notification control method of the presently filed embodiment, when compelling the driving direction of the door mechanism D to be reversed, since the closure position of the door mechanism D is detected at the time instant when applied with the signal for executing the reverse operation, to cause the notifying timing to be controlled on the basis of the detected closure position, the operation of the door mechanism D can be notified at an appropriate timing in dependence on the presence of the door mechanism D remaining at the closure position available for starting the reverse operation.

Furthermore, according to the sliding door notification control method of the presently filed embodiment, since the notifying timing is controlled when, during the reversing operation of the driving direction of the door mechanism D, the detected closure position of the door mechanism D remains in the area-just-prior-to-fully-closed-position forming the predetermined given area, the operation of the door mechanism D can be notified at an appropriate timing even when the door mechanism D is operated due to its inertial force during reversing operation.

Moreover, according to the sliding door notification control method of the presently filed embodiment, since the control signal for driving the door drive motor 9 is transmitted to drive the door mechanism D only when the door mechanism D is not restricted during the reversing operation of the driving direction of the door mechanism D for thereby causing the notification to be implemented when the control signal is applied to the door drive motor 9, the sliding door notification control apparatus is able to realize the same effects as those set forth above.

In addition, according to the sliding door notification control method of the presently filed embodiment, since the notification is provided when, during the reversing operation of the driving direction of the door mechanism D, the reversing drive is implemented with the door drive motor 9, after the drive of the door mechanism D is braked for the given time interval, and the door mechanism D is not restricted after the brake effect is provided for the given time interval, the sliding door notification control apparatus is able to realize the same effects as those set forth above.

Further, according to the sliding door notification control method of the presently filed embodiment, since the notification is implemented after the presence of the door mechanism D driven in the reverse direction is detected on the basis of the closure position of the door mechanism D, the sliding door notification control apparatus is able to realize the same effects as those set forth above.

Furthermore, according to the sliding door notification control method of the presently filed embodiment, since the notifying timing is controlled only when the driving direction of the door mechanism D is reversed from the closing direction to the opening direction, it is possible to avoid the notifying operation from being implemented regardless of the presence of the fully closed condition appearing due to the inertial force of the door mechanism D.

Also, the embodiment set forth above forms one example of the invention. Therefore, the present invention is not limited to a particular structure of the embodiment previously described and of course, it is to be appreciated that the invention can be embodied in other specific forms and a variety of modifications can be made in compliance with designs without departing from the technical teachings of the present invention.

The entire content of Japanese Patent Application No. P2001-389902 with a filing date of Dec. 21, 2001 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A notification control device, comprising:
   a vehicle closure member mounted on a vehicle for opening and closing capabilities;
   a drive unit driving the vehicle closure member between an opening position and a closing position;
   a control unit controlling the drive unit;
   a position detection unit detecting a closure position of the vehicle closure member;
   a notifying unit operative to notify reverse operation of the vehicle closure member when a driving direction in which the vehicle closure member is driven is reversed; and
   a notification timing control unit controlling a notification timing of the notifying unit in a case where the closure position detected by the position detecting unit remains in an area between a half-latch position of the vehicle closure member and a position defined by a speed and weight of the vehicle closure member,
   wherein the position is closer to a fully opened position of the vehicle closure member than the half-latch position, and
   wherein the notifying unit includes a buzzer mechanism that generates a warning sound in response to a control signal from the notification timing control unit.

2. The notification control device according to claim 1, further comprising:
   a restricting unit restricting the vehicle closure member at a closed position; and
   a brake unit applying a brake to the vehicle closure member;
   wherein the control unit controls the brake unit and the drive unit such that during the reverse operation of the driving direction of the vehicle closure member, the brake is applied to the vehicle closure member with the brake unit for a given time interval and subsequently reversing drive is executed with the drive unit; and the notification timing control unit controls the notifying unit so as to notify when the vehicle closure member is not restricted with the restricting unit after the brake is applied with the brake unit for the given time interval.

3. The notification control device according to claim 1, further comprising:

a reverse operation detecting unit detecting the presence of reversed drive of the vehicle closure member in dependence on the closure position detected with the position detecting unit;

wherein the notification timing control unit controls the notifying unit such that the notifying unit is operated when the presence of the reverse drive of the vehicle closure member is detected with the reverse operation detecting unit.

4. A notification control device, comprising:

a vehicle closure member mounted on a vehicle for opening and closing capabilities;

a drive unit driving the vehicle closure member mounted on a vehicle for opening and closing capabilities;

a control unit controlling the drive unit;

a position detecting unit detecting a closure position of the vehicle closure member;

a notifying unit operative to notify reverse operation of the vehicle closure member when a driving direction in which the vehicle closure member is driven is reversed;

a notification control timing unit controlling a notification timing of the notifying unit in a case where the closure position detected by the position detecting units remains in a predetermined area; and a restricting unit restricting the vehicle closure member at a closed position;

wherein the control unit transmits a control signal to the drive unit to drive the vehicle closure member only when the vehicle closure member is not restricted with the restricting unit; and the notification timing control unit controls the notifying unit so as to notify when the control signal is transmitted from the control unit to the drive unit.

5. A notification control device, comprising:

a vehicle closure member mounted on a vehicle for opening and closing capabilities;

a drive unit driving the vehicle closure member mounted on a vehicle for opening and closing capabilities;

a control unit controlling the drive unit;

a position detecting unit detecting a closure position of the vehicle closure member;

a notifying unit operative to notify reverse operation of the vehicle closure member when a driving direction in which the vehicle closure member is driven is reversed, and a notification control timing unit controlling a notification timing of the notifying unit in a case where the closure position detected by the position detecting units remains in a predetermined area, wherein the notification timing control unit controls a timing, at which the notifying unit is operated, only when the driving direction of the vehicle closure member is reversed from a closed position to an open position.

6. A notification control device, comprising:

a vehicle closure member mounted on a vehicle for opening and closing capabilities;

drive means for driving the vehicle closure member between an opening position and a closing position;

control means for controlling the drive means;

position detection means for detecting a closure position of the vehicle closure member;

notifying means for notifying reverse operation of the vehicle closure member when a direction in which the vehicle closure member is driven is reversed; and notification timing control means for controlling a notification timing of the notifying means in a case where the closure position detected with the position detecting means remains in an area between a half-latch position of the vehicle closure member and a position defined by a speed and weight of the vehicle closure member, wherein the position is closer to a fully opened position of the vehicle closure member than the half-latch position, and wherein the notifying means includes a buzzer mechanism that generates a warning sound in response to a control signal from the notification timing control means.

7. A notification control device that operates with a vehicle closure member, the notification control device comprising:

a drive unit that drives the vehicle closure member between an opening position and a closing position;

a control unit that controls the drive unit;

a position detection unit that detects a closure position of the vehicle closure member;

a notifying unit operative to notify reverse operation of the vehicle closure member when a driving direction in which the vehicle closure member is driven is reversed; and a notification timing control unit that controls a notification timing of the notifying unit only in a case where the closure position detected by the position detecting unit remains in an area between a half-latch position of the vehicle closure member and a position defined by a speed and weight of the vehicle closure member, wherein the position is closer to a fully opened position of the vehicle closure member than a half-latch position, and wherein the notifying unit comprises a buzzer mechanism that generates a warning sound in response to a control signal from the notification timing control unit.

* * * * *